US007765031B2

(12) United States Patent
Nagamatsu

(10) Patent No.: US 7,765,031 B2
(45) Date of Patent: Jul. 27, 2010

(54) ROBOT AND MULTI-ROBOT INTERFERENCE AVOIDANCE METHOD

(75) Inventor: Kenji Nagamatsu, Nagoya (JP)

(73) Assignee: Denso Wave Incorporated, Tokyo (JP)

( * ) Notice: Subject to any disclaimer, the term of this patent is extended or adjusted under 35 U.S.C. 154(b) by 796 days.

(21) Appl. No.: 11/603,103

(22) Filed: Nov. 22, 2006

(65) Prior Publication Data

US 2007/0118250 A1    May 24, 2007

(30) Foreign Application Priority Data

Nov. 24, 2005   (JP)  .............................. 2005-338765

(51) Int. Cl.
  *G05B 19/04*   (2006.01)
  *G05B 4/4061*  (2006.01)
(52) U.S. Cl. .................. 700/255; 700/248; 700/253; 700/261; 901/8; 901/14; 901/20; 901/49; 318/568.2; 318/568.11; 414/1
(58) Field of Classification Search .............. 700/245, 700/246, 247, 248, 249, 250, 251, 252, 253, 700/254, 256, 257, 258, 259; 318/568.11, 318/568.12, 568.13, 568.14, 568.15, 568.16, 318/568.17, 568.18, 568.19, 568.1, 568.2, 318/568.21, 568.22, 568.23; 901/2, 6, 8, 901/11, 14, 15, 16, 17, 18, 20, 50; 414/1, 414/2, 3
See application file for complete search history.

(56) References Cited

U.S. PATENT DOCUMENTS 5,227,707 A * 7/1993 Mitomi et al. ........... 318/568.1

| 5,561,742 | A  | * | 10/1996 | Terada et al. .............. 700/255 |
| 6,212,444 | B1 | * | 4/2001  | Kato et al. ................ 700/255 |
| 6,754,555 | B2 | * | 6/2004  | Yamato ................... 700/178 |
| 7,114,157 | B2 | * | 9/2006  | Chaffee et al. ............ 718/104 |
| 7,257,813 | B1 | * | 8/2007  | Mayer et al. .............. 718/102 |
| 7,321,808 | B2 | * | 1/2008  | Nagamatsu ............... 700/248 |
| 7,390,458 | B2 | * | 6/2008  | Burow et al. .............. 422/63 |
| 7,664,570 | B2 | * | 2/2010  | Suita et al. ............... 700/245 |

FOREIGN PATENT DOCUMENTS

| JP | A-3-256681   |   | 11/1991 |
| JP | 04305704 A   | * | 10/1992 |
| JP | A-7-314378   |   | 12/1995 |
| JP | B2 2895672   |   | 5/1999  |
| WO | WO 02/23297  |   | 3/2002  |

OTHER PUBLICATIONS

Office Action issued in JP Application No. 2005-338765 on Mar. 17, 2010 (with English translation).

* cited by examiner

*Primary Examiner*—Thomas G Black
*Assistant Examiner*—Lin B Olsen
(74) *Attorney, Agent, or Firm*—Oliff & Berridge, PLC

(57) ABSTRACT

In a robot, a first determining unit determines whether there is an interference region in which a first occupation region and a second occupation region are at least partially overlapped with each other. A second determining determines whether a second movable part of another robot is at least partially located in the interference region based on an actual position of the second movable part. A stopping unit begins stopping, at a predetermined timing, movement of the first movable part if it is determined that there is the interference region, and that the second movable part is at least partially located in the interference region. The predetermined timing is determined based on a positional relationship between an actual position of the first movable part and the interference region.

9 Claims, 9 Drawing Sheets

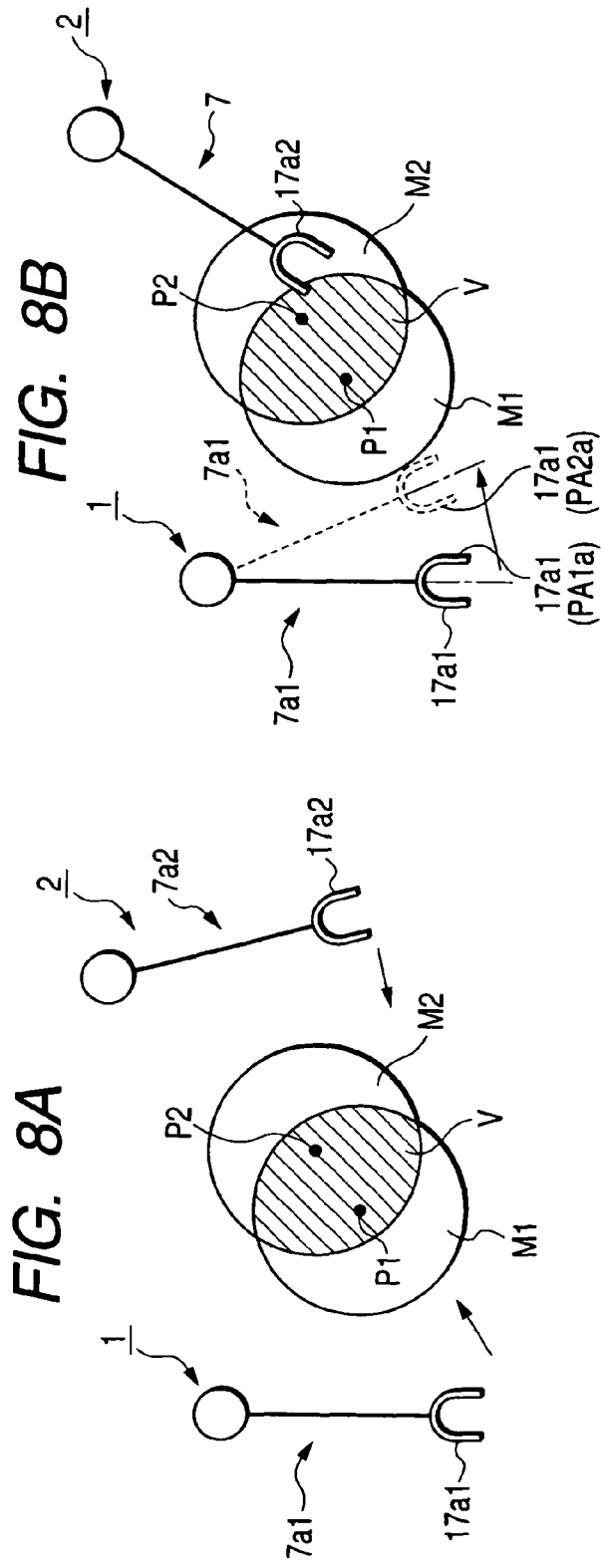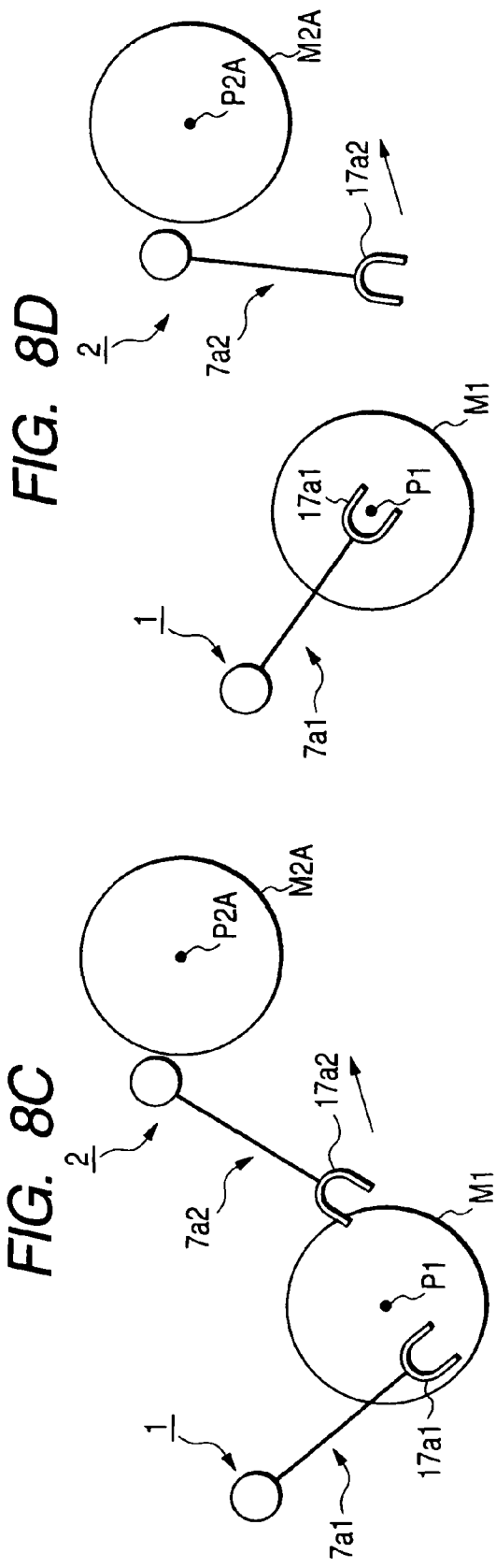

ROBOT AND MULTI-ROBOT INTERFERENCE AVOIDANCE METHOD

CROSS REFERENCE TO RELATED APPLICATIONS

This application is based on Japanese Patent Application 2005-338765 fled on Nov. 24, 2005. This application claims the benefit of priority from the Japanese Patent Application, so that the descriptions of which are all incorporated herein by reference.

FIELD OF THE INVENTION

The present invention relates to methods capable of avoiding interference between a plurality of robots in an overlapped potion between occupation regions of the plurality of robots, and a robot capable of avoiding interference between another robot in an overlapped potion between occupation regions of the robot and another robot.

BACKGROUND OF THE INVENTION

U.S. Pat. No. 5,561,742 corresponding to Japanese Patent Publication No. 2895672 discloses a multiple-robot control method for avoiding interference between a plurality of robots when they are commanded so as to be operated at the same time.

In the method disclosed in the U.S. Patent Publication, FIG. 9 is a top plan view schematically illustrating first and second robots RA and RU respectively mounted on a common plane through bases Sa and Sb. The first and second robots are schematically illustrated as vertical articulated robots, and the bases Sa and Sb are schematically illustrated as circles.

In FIG. 9, reference characters Aa and Ab respectively denote first and second arms of the first and second robots RA and RB, and reference characters Wa and Wb respectively denote wrist portions of the first and second robots RA and RB. Each of the wrist portions Wa and Wb consists of a wrist and a hand.

As illustrated in FIG. 9, a line connecting the centers of the bases Sa and Sb is regarded as a Y-axis, and a line on the common plane and perpendicular to the Y-axis is regarded as an X-axis, and a direction orthogonal to the common plane (X-Y plane) is regarded as a Z-axis. Thus X-Y-Z coordinate system is defined.

The first and second robots RA and RB are programmed to be simultaneously operated.

In the method, an operation command is sent to a controller (not shown) of both the first and second robots RA and RB. The operation command allows the controller to control the first robot RA so that the wrist portion Wa of the first arm Aa of the robot RA moves toward a target position PA to be located thereat. Simultaneously, an operation command is sent to the controller. The operation command allows the controller to control the second robot RB so that the wrist portion Wb of the second arm Ab of the robot RB moves toward a target position PB to be located thereat.

In FIG. 9, a sphere Cha represents a region covering the wrist portion Wa consisting of the wrist and the hand of the first arm Aa and located at the target position PA. Similarly, a sphere Chb represents a region covering the wrist portion consisting of the Wrist and the hand of the second arm Ab and located at the target position PB.

At that time, the controller obtains an X-Z plane Pa set to a position (Y-coordinate value), and defines a first robot's special region MA based on the X-Z plane Pa such that the X-Z plane Pa contacts the sphere Cha and receives it within the first robot's special region MA.

Simultaneously, the controller obtains an X-Z plane Pb set to a position (Y-coordinate value), and defines a second robot's special region MB based on the X-Z plane Pb such that the X-Z plane Pb contacts the sphere Chb and receives it within the second robot's special region MB.

The controller determines whether the obtained first robot's special region MA and the second robot's special region MB are at least partially overlapped with each other.

For example, as illustrated in FIG. 9, the first robot's special region MA and the second robot's special region MB are overlapped to each other.

For this reason, the controller brakes the motion of one of the first and second robot arms Aa and Ab at the timing when it is determined that the first robot's special region MA and the second robot's special region MB are at least partially overlapped to each other.

In other words, the controller prevents one of the robot arms Aa and Ab from moving so that one of the robot arms Aa and Ab is kept at rest while moving the other of the robot arms Aa and Ab toward the corresponding target position. The controller repeatedly executes the determination.

Thereafter, when, because of movement of the other of the robot arms Aa and Ab, it is determined that the obtained first robot's special region MA and the second robot's special region MB are separated from each other, the controller restarts to move one of the robot arms Aa and Ab toward the corresponding target position.

In the method, however, although the wrist portions Wa and Wb of the first and second robot arms Aa and Ab may interfere with each other only when they simultaneously enter the respective special regions MA and MB, each time it is determined that the first robot's special region MA and the second robot's special region MB are at least partially overlapped with each other, the controller brakes the motion of one of the first and second arms Aa and Ab, and keeps it at rest.

Accordingly, the method may increase the length of time before the wrist portions Wa and Wb of the first and second robots RA and RB are completely transferred to the corresponding target positions PA and PB, respectively.

SUMMARY OF THE INVENTION

In view of the background, an object of an aspect of the present invention is to, even if it is determined that a first movable part of a first robot and a second movable part of a second robot interfere with each other upon movement of the first and second movable parts toward corresponding first and second target positions, immediately move the first and second movable parts to the corresponding first and second target positions, respectively.

According to one aspect of the present invention, there is provided a method of avoiding interference between first and second movable parts of first and second robots during movement of the first and second movable parts toward first and second target positions, respectively. The method includes defining a first occupation region for the first movable part of the first robot at the first target position. The first occupation region depends on a pose of the first movable part located at the first target position, and identifies an interference range of the pose of the first movable part. The method includes defining a second occupation region for the second movable part of the second robot at the second target position. The second occupation region depends on a pose of the second movable part located at the second target position, and identifies an interference range of the pose of the second movable part. The method includes determining whether there is an interference region in which the first occupation region and the second occupation region are at least partially overlapped with each other. The method includes determining whether at least one of the first and second movable parts is at least partially located in the interference region based on actual positions of the respective first and second movable parts. The method includes beginning stopping, at a predetermined timing, the movement of one of the first and second movable parts if it is determined that there is the interference region and that the other of the first and second movable parts is at least partially located in the interference region. The predetermined timing is determined based on a positional relationship between the actual position of the one of the first and second movable parts and the interference region.

According to another aspect of the present invention, there is provided a robot communicable with another robot. The robot includes a first movable part, and an operating unit configured to operate the first movable part so as to move the first movable part toward a first target position. The robot includes a first movable part, and an operating unit configured to operate the first movable part so as to move the first movable part toward a first target position. The robot includes a defining unit configured to define a first occupation region for the first movable part at the first target position. The first occupation region depends on a pose of the first movable part located at the first target position, and identifies an interference range of the pose of the first movable part. The robot includes an accessing unit configured to access another robot with a second movable part during movement to obtain information indicative of a second occupation region for the second movable part at a second target position and an actual position of the second movable part. The second occupation region depends on a pose of the second movable part located at the second target position, and identifies an interference range of the pose of the second movable part. The robot includes a first determining unit configured to determine whether there is an interference region in which the first occupation region and the second occupation region are at least partially overlapped with each other. The robot includes a second determining unit configured to determine whether the second movable part is at least partially located in the interference region based on the obtained actual position thereof. The robot includes a stopping unit configured to begin stopping, at a predetermined timing, movement of the first movable part if it is determined that there is the interference region and that the second movable part is at least partially located in the interference region. The predetermined timing is determined based on a positional relationship between an actual position of the first movable part and the interference region.

According to a further aspect of the present invention, there is provided a robot controller for a robot communicable with another robot and having a first movable part. The robot controller is operatively connected to a stopping unit. The robot controller is programmed to operate the first movable part so as to move the first movable part toward a first target position, and define a first occupation region for the first movable part at the first target position. The first occupation region at the first target position depends on a pose of the first movable part located at the first target position, and identifies an interference range of the pose of the first movable part. The robot controller is programmed to access another robot with a second movable part during movement to obtain information indicative of a second occupation region for the second movable part at a second target position and an actual position of the second movable part. The second occupation region at the second target position depends on a pose of the second movable part located at the second target position, and identifies an interference range of the pose of the second movable part. The robot controller is programmed to determine whether there is an interference region in which the first occupation region and the second occupation region are at least partially overlapped with each other. The robot controller is programmed to determine whether the second movable part is at least partially located in the interference region based on the obtained actual position thereof. The robot controller is programmed to control the stopping unit to begin stopping, at a predetermined timing, movement of the first movable part if it is determined that there is the interference region and that the second movable part is at least partially located in the interference region. The predetermined timing is determined based on a positional relationship between an actual position of the first movable part and the interference region.

BRIEF DESCRIPTION OF THE DRAWINGS

Other objects and aspects of the invention will become apparent from the following description of embodiments with reference to the accompanying drawings in which:

FIG. 8A is an enlarged view schematically illustrating a positional relationship among first and second occupation regions, an interference region therebetween, and the first and second robots according to the embodiment;

FIG. 8B is an enlarged view schematically illustrating another positional relationship among the first and second occupation regions, the interference region therebetween, and the first and second robots according to the embodiment;

FIG. 8C is an enlarged view schematically illustrating a positional relationship among the first and second occupation regions and the first and second robots according to the embodiment;

FIG. 8D is an enlarged view schematically illustrating another positional relationship among the first and second occupation regions and the first and second robots according to the embodiment;

DETAILED DESCRIPTION OF EMBODIMENTS OF THE INVENTION

An embodiment of the present invention will be described hereinafter with reference to the FIGS. 1 to 8.

Figure 1:
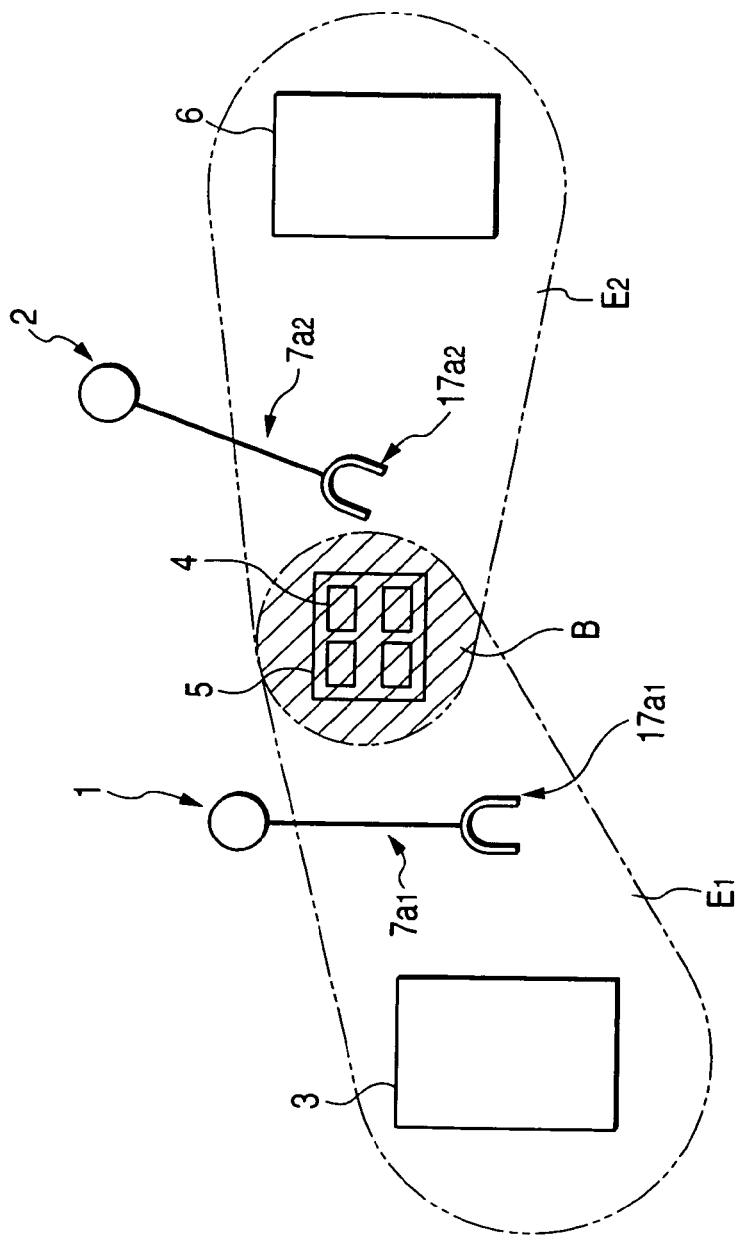
FIG. 1 is a top plan view schematically illustrating an example of the structure of a working system consisting essentially of first and second robots according to an embodiment of the present invention.

In the embodiment, referring to FIG. 1, there are first and second robots 1 and 2 mounted on a common horizontal plane through bases and arranged to be close to each other. In FIG. 1, the first and second robots 1 and 2 are schematically illustrated as vertical articulated robots, and the bases are schematically illustrated as circles.

For example, the first and second robots 1 and 2 constitute a working system in which the first robot 1 performs a predetermined first process and the second robot 2 performs the next second process after the completion of the first process.

Specifically, the first robot 1 is programmed to perform the first process of a workpiece 4 mounted on a workbench 3 mounted on the mount plane, and thereafter, to transfer the processed workpiece 4 toward a pallet 5 mounted on the mount plane to thereby mount it on the pallet 5.

The second robot 2 is programmed to grasp the workpiece 4 mounted on the pallet 5, and to transfer the grasped workpiece 4 toward a workbench 6 mounted on the mount surface to thereby mount it on the workbench 6. The second robot 2 is programmed to execute the second process of the workpiece 4 mounted on the workbench 6.

As illustrated in FIG. 1, when an X-Y plane is defined in the mount plane, and a Z-axis is defined to be orthogonal to the X-Y plane, the first robot 1 has a predetermined three-dimensional first workspace E1 in the X-Y-Z coordinate space. Similarly, the second robot 2 has a predetermined three-dimensional second workspace E2 in the X-Y-Z coordinate space.

The first workspace E1 and the second workspace E2 are overlapped with each other at an area covering the pallet 5. The overlapped space B serves as a shared space B of the first and second robots 1 and 2, which is illustrated by hatching in FIG. 1.

An example of the structure of the first robot 1 will be described hereinafter. It is to be noted that the structure of the second robot 2 is identical to that of the first robot 1. For this reason, similar reference characters are assigned to identical components of the first and second robots 1 and 2, and therefore, descriptions of the structure of the second robot 2 will be omitted or simplified.

Figure 2:
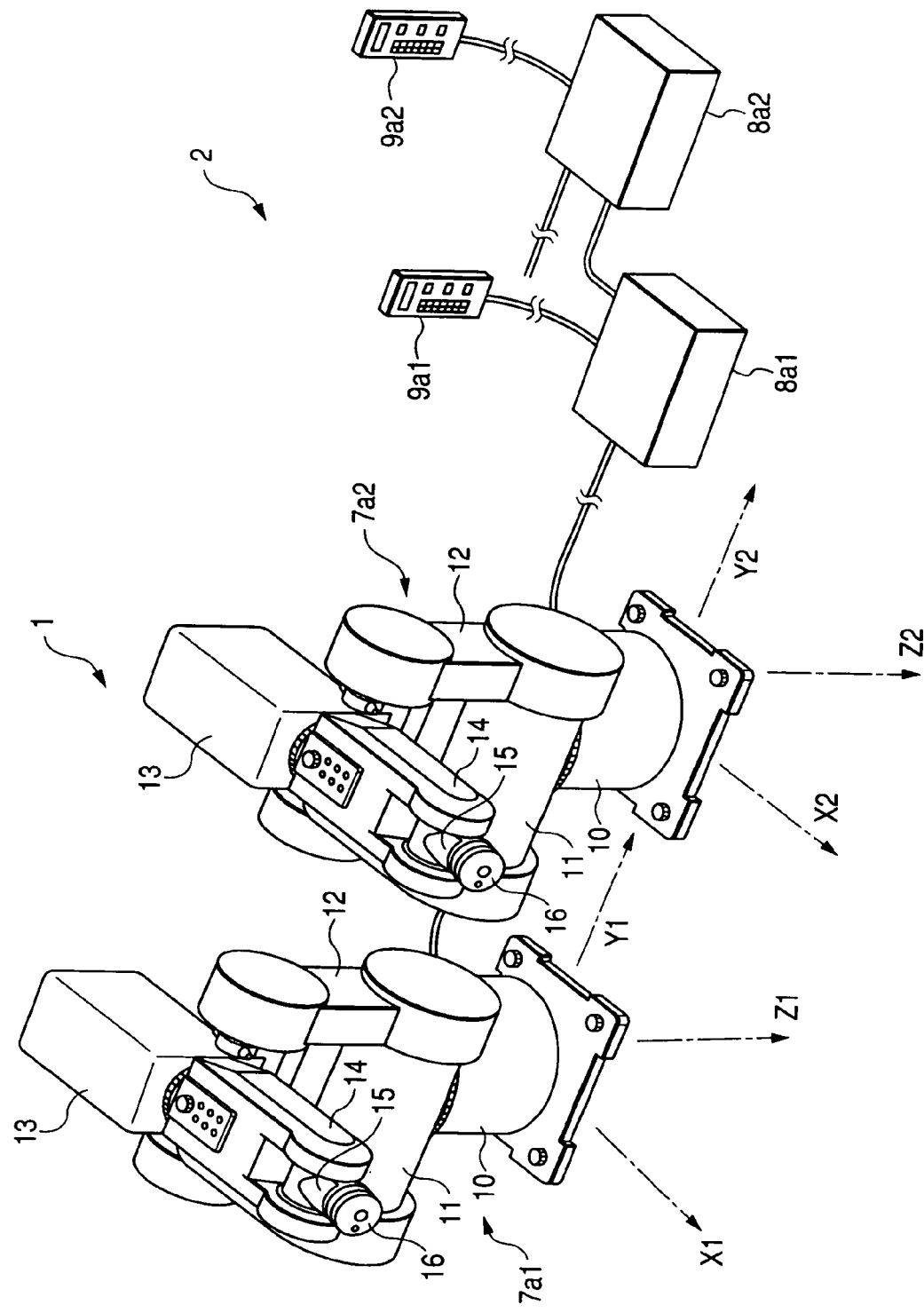
FIG. 2 is a perspective view schematically illustrating an example of the hardware configuration of each of the first and second robots according to the embodiment of the present invention.

Referring to FIG. 2, the first robot 1 according to the embodiment includes a robot body 7a1, a controller 8a1 for controlling the robot body 7a1, and a teaching pendant 9a1 as a teaching box for the controller 8a1. The robot body 7a1 is electrically connected to the controller 8a1, and the controller 8a1 is electrically connected to the teaching pendant 9a1 through a cable.

The robot body 7a1 as a control target for the controller 8a1 is designed as, for example, a vertical articulated robot.

Specifically, the robot body 7a1 is composed of a substantially cylindrical-shaped base 10 mounted on the horizontal mount plane, and a substantially cylindrical-shape shoulder joint 11 mounted on the base 10 such that the center axial direction of the shoulder joint 11 is orthogonal to the center axial direction of the base 10. The shoulder joint 11 is configured to be horizontally rotatable on the base 10 about a center axis thereof.

The robot body 7a1 is also composed of a pair of upper arms (upper arm joints) 12. One ends of the pair of upper arms 12 are pivotally supported by both ends of the shoulder joint 11 about the center axis thereof in the vertical direction corresponding to the center axial direction of the base 10.

The robot body 7a1 is composed of a first lower arm 13 pivotally supported by the other ends of the upper arms 12 in the vertical direction corresponding to the center axial direction of the base 10.

The robot body 7a1 is composed of a second lower arm 14 extending from the first lower arm 13 and rotatably supported thereby about the extending direction. The tip end of the second lower arm 14 is forked. The first and second lower arms 13 and 14 constitute a lower arm joint.

The robot body 7a1 is composed of a substantially cylindrical-shaped wrist joint 15 inserted between the forked ends of the second lower arm 14 and pivotally supported thereby in the vertical direction corresponding to the center axial direction of the base 10.

The wrist joint 15 is formed with a flange 16 projecting therefrom. The flange 16 has a tip end to be rotatable about the projecting direction (center direction) such that the tip end permits the mounting of a mechanical hand (mechanical gripper) 17a1 (see FIGS. 1, 7, and 8) formed at its one end with a grip portion that can grip various types of members including the workpiece 4. Specifically, the flange 16 (its tip end thereof) serves as a hand joint.

The first robot 1 also includes a number of motors 24 as actuators. For example, in the embodiment, DC (Direct Current) servo motors can be preferably used as the motors 24.

Specifically, the base 10 is integrated with at least one of the motors 24 and a rotation transmission system (not shown) that transfers rotation of at least one of the motors 24 to the shoulder joint 11 to horizontally rotate it.

The shoulder joint 11 is integrated with at least one of the motors 24 and a rotation transmission system (not shown) that transfers rotation of at least one of the motors 24 to the upper arms 12 to vertically pivot them together with each other.

The upper arm joints 12 are integrated with at least one of the motors 24 and a rotation transmission system (not shown) that transfers rotation of at least one of the motors 24 to the first lower arm 13 to vertically pivot it.

The first lower arm 13 is integrated with at least one of the motors 24 and a rotation transmission system (not shown) that transfers rotation of at least one of the motors 24 to the second lower arm 14 to rotate it about the extending direction.

The second lower arm 14 is integrated with at least one of the motors 24 and a rotation transmission system (not shown) that transfers rotation of at least one of the motors 24 to the wrist joint 15 to vertically pivot it.

The flange 16 is integrated with at least one of the motors 24 and a rotation transmission system (not shown) that transfers rotation of at least one of the motors 24 to the mechanical hand 17a1 to rotate it about the projecting direction of the flange 16.

Specifically, the base 10, the shoulder joint 11, the upper arm joints 12, the lower arm joint (the first and second lower arms 13 and 14), the wrist joint 15, and the hand joint (flange) 16 of the robot body 7 serve as linkages (linkage mechanisms) of the first robot 1.

Information indicative of dimensions of each of the linkages 11 to 16 and the hand 17a1, such as the length of each of the linkages 11 to 16 in the longitudinal direction or axial direction, are stored beforehand in, for example, a ROM of the controller 8a1 described hereinafter.

Figure 3:
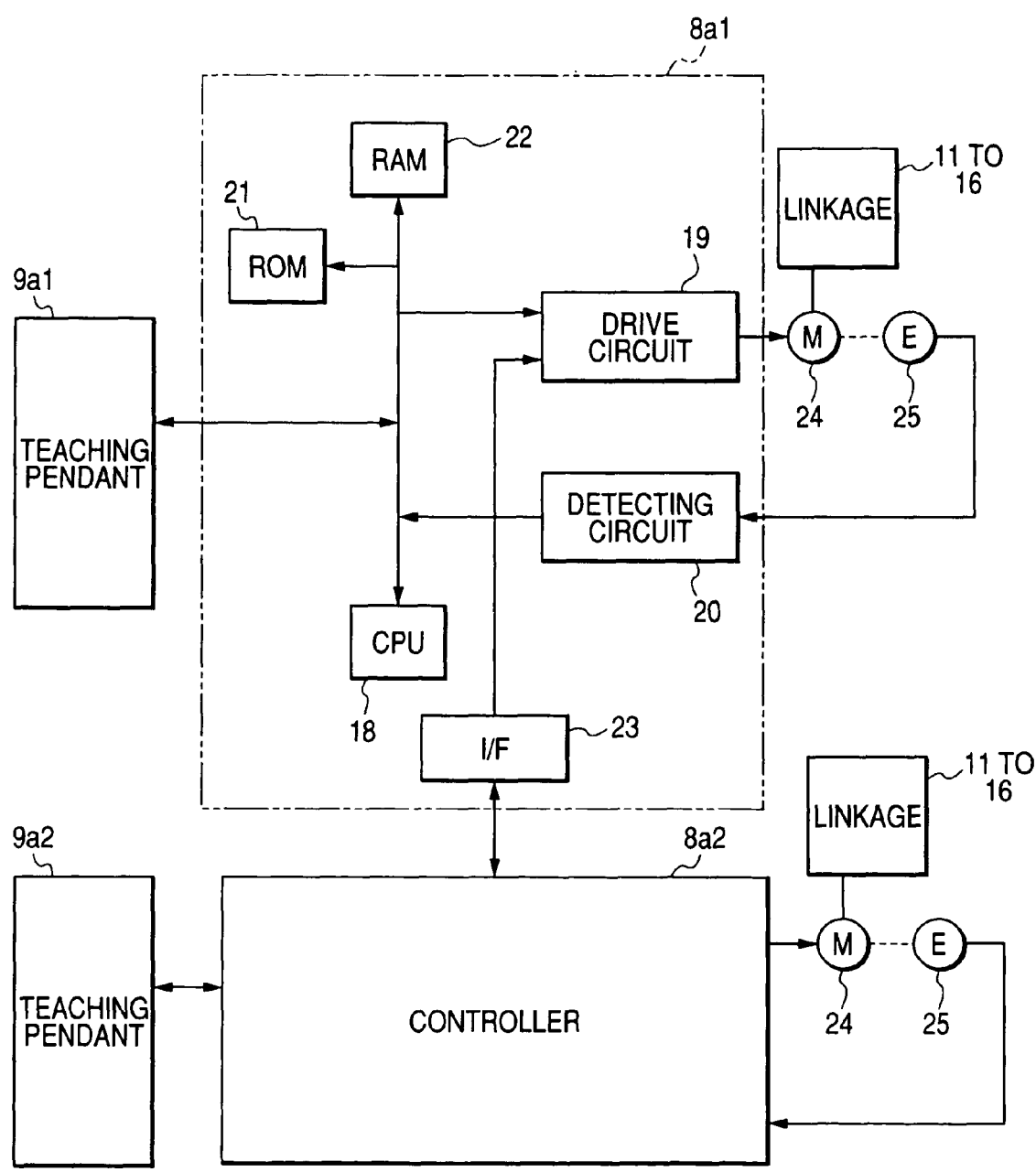
FIG. 3 is a block diagram schematically illustrating an example of the system configuration of each of the first and second robots illustrated in FIG. 2.

As illustrated in FIG. 3, the controller 8a1 includes a CPU 18 sewing as a control unit, drive circuits 19 for driving the motors 24a1, a detecting circuit 20, a ROM (Read Only Memory, such as an EEPROM, flash ROM, or the like) 21, a RAM (Random Access Memory) 22, and an interface (I/F) 23. The elements 19 to 23 are electrically connected to the CPU 18.

The ROM 21 has stored therein system programs that cause the CPU 18 to control the system resources of the first robot 1. The ROM 21 also has stored therein a robot language for creating a robot motion program.

The RAM 22 has stored therein the robot motion program and the like.

The I/F 23 is designed to be electrically connectable to the teaching pendant 9a1.

It is to be noted that, in FIG. 2, the shoulder joint 11, the upper arm joints 12, the lower arm joint (the first and second lower arms 13 and 14), the wrist joint 15, and the hand joint 16 are collectively illustrated as a linkage by one block. Reference numerals 11, 12, 13, 14, 15, and 16 are assigned to the block of linkage.

As the motors for driving the linkages (joint portions) 11 to 16 are collectively illustrated as one block to which reference numeral 24 is assigned.

The detecting circuit 20 is operative to detect an actual position and an actual angular velocity of each of the linkages 11, 12, 13, 14, 15, and 16.

It is to be noted that, for example, each of the linkages 11 to 16 and the hand 17a1 has a predetermined reference position. Thus, the actual position of each of the linkages 11 to 16 and the hand 17a1 can be detected as the actual position of the reference position of each of the linkages 11 to 16 and the hand 17a1.

Specifically, a rotary encoder 25 is attached to, for example, the rotating shaft of each of the motors 24, and is electrically connected to the detecting circuit 20.

The rotary encoder 25 serves as a position sensor and a speed sensor. Specifically, the rotary encoder 25 is configured to output digital pulses that correspond to angular motion (revolution) of the rotating shaft of each of the motors 24. The pulse signal consisting of the train of the digital pulses is given to the detecting circuit 20.

The detecting circuit 20 is operative to detect, based on the pulse signal sent from each of the rotary encoders 25, the actual position of the rotating shaft of each of the motors 24, and therefore, the actual position of each of the linkages 11 to 16.

In addition, the detecting circuit 20 is operative to:

count the number of the pulses in the pulse signal input from each of the rotary encoders 24 per unit of time; and detect, based on the counted result, the actual angular velocity of the rotating shaft of each of the motors 24, in other words, the actual angular velocity of each of the linkages 11 to 16.

The detecting circuit 20 is also operative to give the CPU 18 information indicative of the actual position and actual angular velocity of each of the linkages 11 to 16.

The CPU 18 is operative to execute feedback control of the motion of each of the linkages (the joint portions) 11 to 16 in accordance with the robot motion program using the information sent from the detecting circuit 20.

Each of the drive circuits 19 is operative to supply, to each of the corresponding motors 24, a drive current under control of the CPU 18 to rotatably drive the individual motors 24 corresponding to the individual linkages 11 to 16, thereby controlling the pose of each of the linkages 11 to 16.

The drive circuits 19 and the corresponding motors 24 also serve as regenerative braking means or reverse-torque braking means for braking corresponding linkages 11 to 16.

Specifically, a drive circuit 19 is operative to switch the direction of current to be supplied to a corresponding motor 24 to allow the motor 24 to become a generator to thereby generate reverse torque to be applied in the direction opposite to the motor rotating direction. The reverse torque allows a corresponding one of the linkages 11 to 16 to be braked. Preferably, power generated by the motor 24 serving as the generator can be delivered to a power supply unit (not shown) of the controller 8a1 to be charged therein.

In the embodiment, it is to be noted that the weight of each of the linkages 11 to 16 has been measured to be stored in, for example, the ROM 21, and, as described above, the actual angular velocity of each of the linkages 11 to 16 is detected to be sent to the CPU 18.

For this reason, when controlling the drive circuits 19 and the motors 24 to start braking the motion of each of the linkages 11 to 16, the CPU 18 is operative to compute a distance by which each of the linkages 11 to 16 and the hand 17a1 has passed since the start of braking. The distance will be referred to as braking distance hereinafter.

Figure 7A:
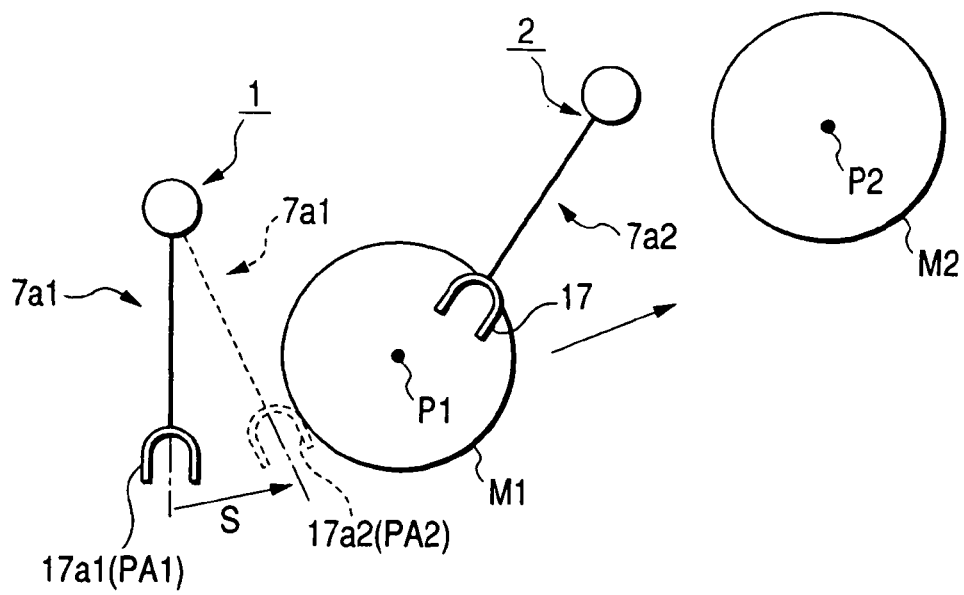
FIG. 7A is an enlarged view schematically illustrating a positional relationship among first and second occupation regions and the first and second robots according to the embodiment.

For example, in FIG. 7A, an example of the braking distance of the hand 17a1 of the first robot 1 between a position PA1 and a position PA2 is illustrated by a reference character "S". Specifically, FIG. 7A represents that the hand 17a1 has shifted from the position PA1 to the position PA2 by the braking distance S since the start of braking.

Note that, in the embodiment, as illustrated in FIG. 2, a robot coordinate system (X1, Y1, Z1) of the base 10 is established independently of the motion of each of the linkages 11 to 16 of the robot body 7a1 of the first robot 1.

For example, the robot coordinate system (X1, Y1, Z1) is, for example, established such that:

the Y1 axis is parallel to the center axis of the shoulder joint 11;

the Z1 axis thereof coincides with the center axis of the base 10; and the X1 axis is orthogonal to the Y and Z axes.

The robot coordinate system (X1, Y1, Z1) of the first robot 1 is used as the reference coordinate system of the first robot 1.

In addition, in the embodiment, a fixed three-dimensional coordinate system (linkage coordinate system) is established for each of the linkages 11 to 16. The position and orientation of the linkage coordinate system of each of the linkages 11 to 16 in the reference coordinate system (X1, Y1, Z1) depends on the motion of each of the linkages 11 to 16.

Specifically, the CPU 18 is operative to convert the pose (position and orientation) of each of the linkages 11 to 16 on the corresponding linkage coordinate system into a position and an orientation in the reference coordinate system (X1, Y1, Z1) based on the information indicative of the actual position of each of the linkages 11 to 16 detected by the detecting circuit 20 and that indicative of the dimensions of each of the linkages 11 to 16 stored in the ROM 21.

Figure 4:
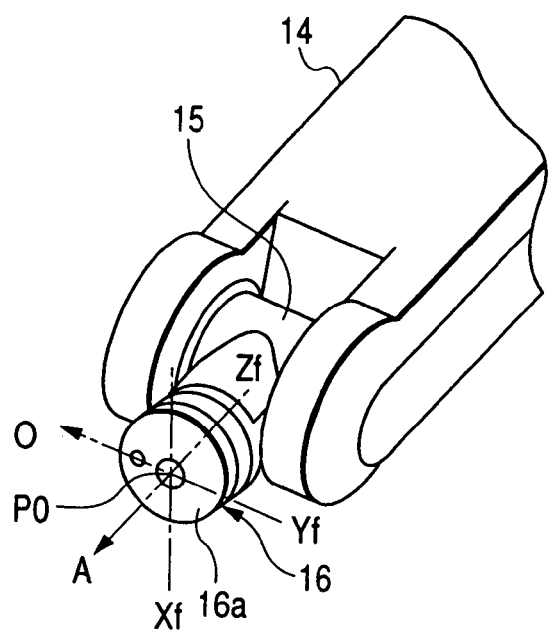
FIG. 4 is an enlarged perspective view schematically illustrating an example of a fixed three-dimensional coordinate system of a flange of a robot body of each of the first and second robots according to the embodiment.

For example, in the embodiment, as illustrated in FIG. 4, a fixed three-dimensional coordinate system of the linkage (flange) 16 is established as a flange coordinate system (Xf, Yf, Zf). The three-dimensional flange coordinate system (Xf, Yf, Zf) has a point of origin Po corresponding to the rotation center of the tip end of the flange 16. Two axes of the three-dimensional flange coordinate system (Xf, Yf, Zf) are defined on the tip end surface 16*a* of the flange 16 and a plane extending from the tip end surface thereof, and the remaining one axis is defined on the center axis (rotational axis) of the flange 16.

A user freely sets three axial directions of the three-dimensional axes Xf, Yf, Zf of the flange coordinate system (Xf, Yf, Zf).

In the embodiment, for example, Xf and Yf axes are defined on the tip end surface 16*a* of the flange 16 such that the Yf axis is parallel to the center direction of the wrist joint 15, and the Xf direction is set to be orthogonal to the Yf axis and the center axis of the flange 16. The remaining axis Zf is defined on the center axis (rotation axis) of the flange 16.

In addition, the pose of the flange 16 of the first robot arm 1, in other words, the pose of the robot body 7*a*1 of the first robot arm 1 is defined by an approach vector A whose length is "1", and an orient vector O whose length "1".

The approach vector A is directed in the Zf axis to project from the origin P0 to be separate from the tip end surface 16*a* of the flange 16. The projecting direction of the approach vector A will be referred to as a negative direction.

The orient vector O is directed in the Yf as to project from the origin P0 to be separate therefrom. The projecting direction of the orient vector O will be referred to as a positive direction.

For example, when the flange coordinate system (Xf, Yf, Zf) is parallely shifted such that the origin Po coincides with the origin of the reference coordinate system (X1, Y1, Z1), the pose of the flange 16 can be represented based on the approach vector A and the orient vector O in the reference coordinate system (X1, Y1, Z1).

When mounting a workpiece 4 gripped by the hand 17*a*1 on the pallet 5, and picking up a workpiece 4 from the pallet 5, the first robot arm 1 controls the hand 17*a*1 to be vertically directed toward the mount plane of the first robot 1.

Specifically, when mounting the workpiece 4 gripped by the hand 17*a*1, the first robot 1 is programmed to direct the hand 17*a*1 downward, transfer the hand 17*a*1 above the pallet 5, and relieve the griped workpiece 4 from downward-directed hand 17*a*1. Moreover, when picking up a workpiece 4 mounted on the pallet 5, the first robot 1 is programmed to direct the hand 17*a*1 downward, approach the downward-directed hand 17*a*1 to the pallet 5, and pick up the workpiece 4 from the pallet 5.

As described above, when the hand 17*a*1 is located close to the pallet 5, the first robot 1 controls the hand 17*a*1 to be directed downward. In other words, when the hand 17*a*1 is located close to the pallet 5, the first robot 1 controls the wrist joint 15 such that the approach vector A is oriented downward with the tip end surface 16*a* of the flange 16 kept parallel to the mount place (X-Y plane of the reference coordinate system).

Similarly, the second robot 2 includes a robot body 7*a*2, a controller 8*a*2 for controlling the robot body 7*a*2, and a teaching pendant 9*a*2 as a teaching box for the controller 8*a*2. The robot body 7*a*2 is electrically connected to the controller 8*a*2, and the controller 8*a*2 is electrically connected to the teaching pendant 9*a*2 through a cable.

As illustrated in FIG. 2, the robot body 7*a*2 has the same structure as the robot body 7*a*1. Like the robot body 7*a*1, a robot coordinate system (X2, Y2, Z2) of the base 10 of the second robot 2 is established independently of the motion of each of the linkages 11 to 16 of the robot body 7*a*2 of the second robot 2, which is used as a reference coordinate system of the second robot 2.

In addition, the controller 8*a*2 of the second robot 2 has the same structure as the controller 8*a*1 of the first robot 1. The controllers 8*a*1 and 8*a*2 are communicable with each other via their interfaces 23.

Coordinates in the reference coordinate system (X1, Y1, Z1) of the first robot 1 and those in the reference coordinate system (X2, Y2, Z2) of the second robot 2 can be easily converted with each other.

Accordingly, the controller 8*a*1 of the first robot 1 is operative to:

freely access the controller 8*a*2 to read the pose position and orientation) of each of the linkages 11 to 16 of the second robot 2 in the reference coordinate system (X2, Y2, Z2); and convert the pose (position and orientation) of each of the linkages 11 to 16 of the second robot 2 in the reference coordinate system (X2, Y2, Z2) into a pose (position and orientation) of each of the linkages 11 to 16 of the second robot 2 in the reference coordinate system (X1, Y1, Z1).

Similarly, the controller 8*a*2 of the second robot 2 is operative to:

freely access the controller 8*a*1 to read the pose (position and orientation) of each of the linkages 11 to 16 of the first robot 1 in the reference coordinate system (X1, Y1, Z1); and convert the pose (position and orientation) of each of the linkages 11 to 16 of the first robot 1 in the reference coordinate system (X1, Y1, Z1) into a pose (position and orientation) of each of the linkages 11 to 16 of the first robot 1 in the reference coordinate system (X2, Y2, Z2).

In the embodiment, as described above, a first occupation region M1 is defined at the hand portion of the robot body 7*a*1 of the first robot 1 that takes such a pose that the hand 17*a*1 is directed downward at a space above the pallet 5 and therearound.

Similarly, a second occupation region M2 is defined at the hand portion of the robot body 7*a*2 of the second robot 2 that takes such a pose that the hand 17*a*2 is directed downward at a space above the pallet 5 and therearound.

The first occupation region M1 at a position represents a region that depends on a pose of the hand 17*a*1 at the position.

Similarly, the second occupation region M2 at a position represents a region that depends on a pose of the hand 17*a*2 at the position.

Specifically, the first occupation region M1 identifies an interference range of the pose of the first movable part. In other words, the first occupation region M1 can prevent interference between the first and second robots 1 and 2 with each other even though their hands 17*a*1 and 17*a*2 are entered into the shared workspace B unless the hand 17*a*2 of the second robot 2 enters into the first occupation region M1.

Similarly, the second occupation region M2 identifies an interference range of the pose of the second movable part. In other words, the second occupation region M2 can prevent interference between the first and second robots 1 and 2 even though their hands 17*a*1 and 17*a*2 are entered into the shared workspace B unless the hand 17*a*1 of the first robot 1 enters into the second occupation region M2.

Figure 5:
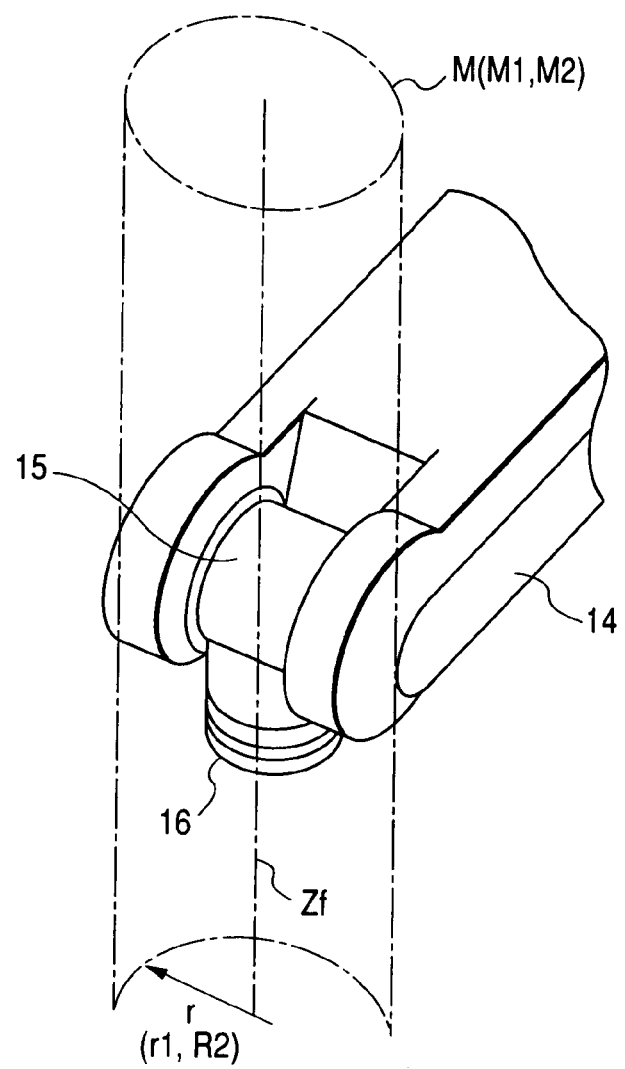
FIG. 5 is an enlarged perspective view schematically illustrating an example of the configuration of an occupation region defined at a hand portion of the robot body of each of the first and second robots according to the embodiment.

For example, in the embodiment, as illustrated in FIG. 5, the occupation region M1 is defied as a substantially cylindrical region whose center axis is arranged to be coaxial to the Zf axis of the downward-directed flange 16 of the robot body 7*a*1. The cylindrical occupation region M1 has an infinite axial length or a predetermined axial length and a predetermined diameter r1 equal to or slightly longer than the maximum width (lateral length) of the forked tip end of the second lower arm 14 of the robot body 7a1 that rotatably supports the wrist joint 15.

Similarly, the occupation region M2 is defied as a substantially cylindrical region whose center axis is arranged to be coaxial to the Zf axis of the downward-directed flange 16 of the robot body 7a2. The cylindrical occupation region M2 has an infinite axial length or a predetermined axial length and a predetermined diameter r2 equal to or slightly longer than the maximum width (lateral length) of the forked tip end of the second lower arm 14 of the robot body 7a2 that rotatably supports the wrist joint 15.

The defined occupation regions M1 and M2 are stored beforehand in, for example, the RAM 22.

On the other hand, the teaching pendant 9a1 is designed to a handheld device composed of an input unit, a display unit, a memory unit, and a computing unit, which allow execution of basic functions, such as program start function, motion teaching function, machine lock functions, error message displaying functions, and the like. This handheld configuration of the teaching pendant 9a1 allows an operator to control the robot body 7a1 while observing the motion of the robot body 7a1.

In the embodiment, information indicative of intended motions of the hand 17a1 of the robot body 7a1 is given to the controller 8a1 by teaching tasks of the teaching pendant 9a1.

Specifically, the teaching pendant 9a1 is operative to:

execute a teaching task of actually moving the hand 17a1 of the robot body 7a1 at desired route points based on intended motions while bringing the grip portion to a desired pose at each of the desired target positions;

teach the controller 8a1 command positions of each of the linkages 11 to 16 of the robot body 7a1 in the reference coordinate system, which correspond to the desired route points and are required to move the hand 17a1 through the trajectory based on the desired route points; and teach the controller 8a1 a target pose of each of the linkages 11 to 16 at each of the command positions, which is required to bring the hand 17a1 to the desired pose at each of the desired route points.

The controller 8a1 stores the taught command positions and the target poses respectively corresponding thereto of each of the linkages 11 to 16 of the robot body 7a1 in the RAM 22.

As well as the teaching pendant 7a1, the teaching pendant 7a2 of the second robot 2 is operative to:

execute a teaching task of actually moving the hand 17a2 of the robot body 7a2 at desired route points based on intended motions while bringing the hand 17a2 to a desired pose at each of the desired target positions;

teach the controller 8a2 target command positions of each of the linkages 11 to 16 of the robot body 7a2 in the reference coordinate system, which correspond to the desired route points and are required to move the hand 17a2 through the trajectory based on the desired route points; and teach the controller 8a2 a target pose of each of the linkages 11 to 16 at each of the command positions, which is required to bring the hand 17a2 to the desired pose at each of the desired route points.

The controller 8a2 stores the taught command positions and the target poses respectively corresponding thereto of each of the linkages 11 to 16 of the robot body 7a2 in the RAM 22.

In the embodiment, the intended motions of the hand 17a1 of the first robot 1 to be taught to the controller 8a1 are required for the first robot 1 to:

perform the first process of a workpiece 4 mounted on the workbench 3;

transfer the processed workpiece 4 toward the pallet 5; and mount it on the pallet 5.

Similarly, the intended motions of the hand 17a2 of the second robot 2 to be taught to the controller 8a2 are required for the second robot 2 to:

grasp a workpiece 4 mounted on the pallet 5;

transfer the grasped workpiece 4 toward the workbench to mount it thereon; and perform the second process of the workpiece 4 mounted on the workbench 6.

During teaching of the target command positions of each linkage to the controller 8a1, the predetermined three-dimensional first workspace E1 of the first robot 1 and the shared workspace B of the first and second robots 1 and 2 are stored in the ROM 21 of the controller 8a1 as a coordinate space in the reference coordinate system (X1, Y1, Z1).

Similarly, during teaching of the target command positions of each linkage to the controller 8a2, the predetermined three-dimensional second workspace E2 of the second robot 2 and the shared space B of the first and second robots 1 and 2 are stored in the ROM 21 of the controller 8a2 as a coordinate space in the reference coordinate system (X2, Y2, Z2).

In order to operate the robot body 7a1 in accordance with the intended motions taught by the teaching pendant 9a1, the CPU 18 of the controller 8a1 alternately sends, at predetermined intervals, first and second operation commands for each of the linkages 11 to 16 to corresponding each of the motors 24 through a corresponding one of the drive circuits 19. The first and second operation command instruct each of the linkages 11 to 16 to move the hand 17a1 between a pair of target positions. The paired target positions correspond to the workbench 3 and the pallet 5.

Specifically, each time the first process of the hand 17a1 of the first robot 1 at the workbench 3 is completed, the CPU 18 sends the first operation command for each of the linkages 11 to 16 to corresponding each of the motors 24 through a corresponding one of the drive circuits 19. This allows each of the motors 24 to move a corresponding one of the linkages 11 to 16 of the robot body 7a1 via the taught command positions (rout points) while bringing the corresponding one of the linkages 11 to 16 to the target poses associated with the taught command positions toward the pallet 5.

In addition, each time the workpiece mounting process of the hand 17a1 of the robot body 7a1 at the pallet 5 is completed, the CPU 18 sends the second operation command for each of the linkages 11 to 16 to corresponding each of the motors 24 through a corresponding one of the drive circuits 19. This allows each of the motors 24 to move a corresponding one of the linkages 11 to 16 of the robot body 7a1 via the taught command positions (rout points) while bringing the corresponding one of the linkages 11 to 16 to the target poses associated with the taught command positions toward the workbench 3.

As a result, in accordance with the taught motions, the hand 17a1 of the first robot 1 repeatedly works to perform the first process of a workpiece 4 mounted on the workbench 3, transfer the processed workpiece 4 toward the pallet 5, mount it on the pallet 5, and return to the workbench 3.

Similarly, in order to operate the robot body 7a2 in accordance with the intended motions taught by the teaching pendant 9a2, the CPU 18 of the controller 8a2 alternately sends, at predetermined intervals, first and second operation commands for each of the linkages 11 to 16 to corresponding each of the motors 24 through a corresponding one of the drive circuits 19. The first and second operation command instruct each of the linkages 11 to 16 to move the hand 17a2 between a pair of target positions. The paired target positions correspond to the pallet 5 and the pallet 5.

Specifically, each time the workpiece mounting process of the hand 17a1 of the first robot 1 at the pallet 5 is completed, the CPU 18 sends the first operation command for each of the linkages 11 to 16 to corresponding each of the motors 24 through a corresponding one of the drive circuits 19. This allows each of the motors 24 to move a corresponding one of the linkages 11 to 16 of the robot body 7a2 via the taught command positions (rout points) while bringing the corresponding one of the linkages 11 to 16 to the target poses associated with the taught command positions toward the pallet 5.

In addition, each time the workpiece picking up process of the hand 17a2 of the robot body 7a2 at the pallet 5 is completed, the CPU 18 sends the second operation command for each of the linkages 11 to 16 to corresponding each of the motors 24 through a corresponding one of the drive circuits 19. This allows each of the motors 24 to move a corresponding one of the linkages 11 to 16 of the robot body 7a1 via the taught command positions (rout points) while bringing the corresponding one of the linkages 11 to 16 to the target poses associated with the taught command positions toward the workbench 6.

As a result, in accordance with the taught motions, the grip portion of the hand 17a2 of the second robot 2 repeatedly works to:

pick up the workpiece 4 mounted on the pallet 5;

transfer the grasped workpiece 4 toward the workbench 6 to mount it thereon;

perform the second process of the workpiece 4 mounted on the workbench 6; and return to the pallet 5 so as to pick up another one workpiece 4 on the pallet 5.

In the first and second robots 1 and 2 mentioned above, the hands 17a1 and 17a2 of the first and second robots 1 and 2 may simultaneously entered into the shared workspace B to respectively mount the grasped workpiece 4 on the pallet 5 and pickup the workpiece 4 from the pallet 5. This may cause interference between the robot body 7a1 (the hand 17a1) and the robot body 17a2 (the hand 17a2) in the shared workspace B.

An interference avoiding function installed in each of the first and second robots 1 and 2 according to the embodiment however prevents both robot bodies 7a1 and 7a2 from being interfered with each other even if both hands 17a1 and 17a2 of the robot bodies 7a1 and 7a2 actually are entered into the shared workspace B.

In the embodiment, the CPU 18 of each of the first and second robots 1 and 2 is operative to run the robot motion program stored in the RAM 22 to cause each of the robot bodies 7a1 and 7a2 to perform the corresponding works mentioned above.

Especially, the robot motion program allows the CPU 18 of each robot to implement the interference avoiding function.

Next, a robot motion task including an interference avoiding task to be executed by the CPU 18 of each robot in accordance with the robot motion program will be described hereinafter with reference to FIGS. 6 to 8.

Figure 6:
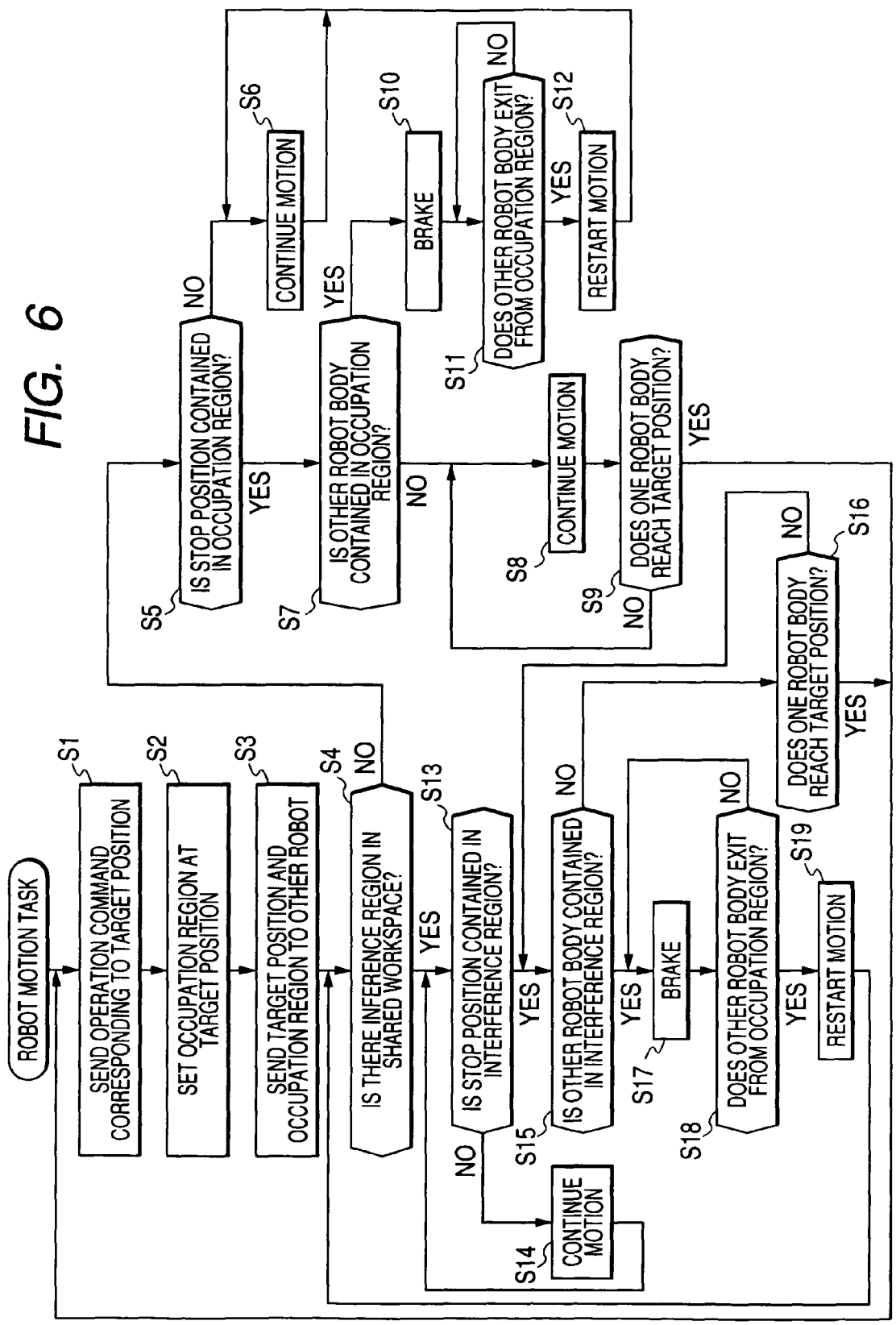
FIG. 6 is a flowchart schematically illustrating a robot motion task to be executed by a controller of each of the first and second robots according to the embodiment.

In each of the first and second robots 1 and 2, in step S1 of FIG. 6, the CPU 18 sends the first or second operation command to each motor 24 via a corresponding one of the drive circuits 19, thereby starting the movement of the corresponding robot body toward a target position corresponding to the sent first or second operation command.

For example, in parallel with the operation in step S1, the CPU 18 establishes an occupation region M (a corresponding one of the first and second occupation regions M1 and M2) at the target position in the reference cooperative system in a state that the corresponding hand is located at the target position such that the approach vector A is directed downward in step S2. Then, the CPU 18 stores the established occupation region M (each of the first and second occupation regions M1 and M2) in the RAM 22.

For example, in parallel with the operation in step S1, the CPU 18 of each of the robots 1 and 2 sends the target position and the established occupation region M associated therewith to the CPU 18 of the other of the robots 1 and 2 through the I/P 23 in step S3.

In addition, the CPU 18 of each of the robots 1 and 2 repeatedly sends an actual position of each linkage and hand to the CPU 18 of the other of the robots 1 and 2 through the I/F 23.

After the start of movement of the corresponding hand toward the target position, the CPU 18 determines whether a corresponding one of the occupation regions M1 and M2 is at least partially overlapped with the other of the occupation regions M1 and M2 in step S4.

For example, in step S1, it is assumed that the CPU 18 of the first robot 1 sends, to each motor 24 through a drive circuit 19, the first operation command corresponding to the target position of the pallet 5, and that the CPU 18 of the second robot 2 sends, to each motor 24 through a drive circuit 19, the second operation command corresponding to the target position of the workbench 6.

In this assumption, the CPU 18 determines that the corresponding one of the occupation regions M1 and M2 is not overlapped with the other of the occupation regions M1 and M2 in step S4 (the determination in step S4 is NO). Then, the CPU 18 proceeds to step S5.

In contrast, in step S1, it is assumed that the CPU 18 of the first robot 1 sends, to each motor 24 through a drive circuit 19, the first operation command corresponding to the target position of the pallet 5, and that the CPU 18 of the second robot 2 sends, to each motor 24 through a drive circuit 19, the first operation command corresponding to the target position of the pallet 5.

In this assumption, the CPU 18 determines that the corresponding one of the occupation regions M1 and M2 is at least partially overlapped with the other of the occupation regions M1 and M2 in step S4 (the determination in step S4 is YES).

Specifically, in the affirmative determination in step S4, an interference region in which each of the occupation regions M1 and M2 is at least partially overlapped with the other of the occupation regions M1 and M2 arises in the shared workspace B. Then, the CPU 18 proceeds to step S13.

Task in Case of No Occurrence of Overlap Between Occupation Regions

In step 5, assuming that the CPU 18 controls the drive circuits 19 and the motors 24 to start braking the motion of each of the linkages 11 to 16 of the corresponding one of the robot bodies 7a1 and 7a2 by a predetermined first braking torque, the CPU 18 computes, based on the weight of each linkage and the hand and an actual angular velocity of each linkage, a braking distance by which each linkage and the hand has passed since the start of braking.

Moreover, in step S5, the CPU 18 estimates a stop position (coordinates) of each of the linkages 11 to 16 and the hand 17 (a corresponding one of the hands 17a1 and 17a2) of the corresponding one of the robot bodies 7a1 and 7a2 in the corresponding reference coordinate system based on the actual position and the braking distance of each of the linkages 11 to 16 and the hand 17.

For example, as illustrated in FIG. 7A, when the braking of the hand 17a1 located at the actual position PA1 is assumed to be started, the hand 17a1 is assumed to be shifted so that it reaches the stop position PA2.

In step S5, the CPU 18 determines whether the estimated stop position of each of the linkages 11 to 16 and the hand 17 of the corresponding one of the robot bodies 7a1 and 7a2 is contained in a corresponding one of the occupation regions M1 and M2 based on a relationship between each estimated stop position and the corresponding one of the occupation regions M1 and M2 in the corresponding reference coordinate system.

If it is determined that no estimated stop positions of the linkages 11 to 16 and the hand 17 are contained in the corresponding one of the occupation regions M1 and M2 (the determination in step S5 is NO), the CPU 18 proceeds to step S6.

In step S6, the CPU 18 continues the motion of the hand 17 toward the target position while sending the actual position to the CPU 18 of the other of the first and second robots 1 and 2 and executing the determination in step S5 until the determination in step S5 is YES.

Continuous motion of the hand 17 of a corresponding one of the robot bodies 7a1 and 7a2 allows the hand 17 to gradually approach the corresponding one of the occupation regions M1 and M2 so as to be slightly entered thereinto. At that time, the determination in step S5 is affirmative, the CPU 18 shifts to step S7.

In step S7, the CPU 18 determines whether the other of the robot bodies 7a1 and 7a2 is at least partly located in the corresponding one of the occupation regions M1 and M2 based on a relationship between the actual position of each linkage and the hand of the other of the robot bodies 7a1 and 7a2 and the corresponding one of the occupation regions M1 and M2 in the corresponding reference coordinate system.

For example, as illustrated in FIG. 7A, it is assumed that:

the hand 17a1 of the first robot 1 is being moved toward the target position of the first robot 1, represented by "P1" in FIG. 7A, in the first occupation region M1; and the hand 17a2 of the second robot 2 located inside the first occupation region M1 is being moved toward the target position of the second robot 2, represented by "P2" in FIG. 7A, in the second occupation region M2.

In this assumption, because the hand 17a2 of the second robot 2 is located inside the first occupation region M1, the CPU 18 of the first robot 1 makes an affirmative determination in step S7, proceeding to step S10.

Figure 7B:
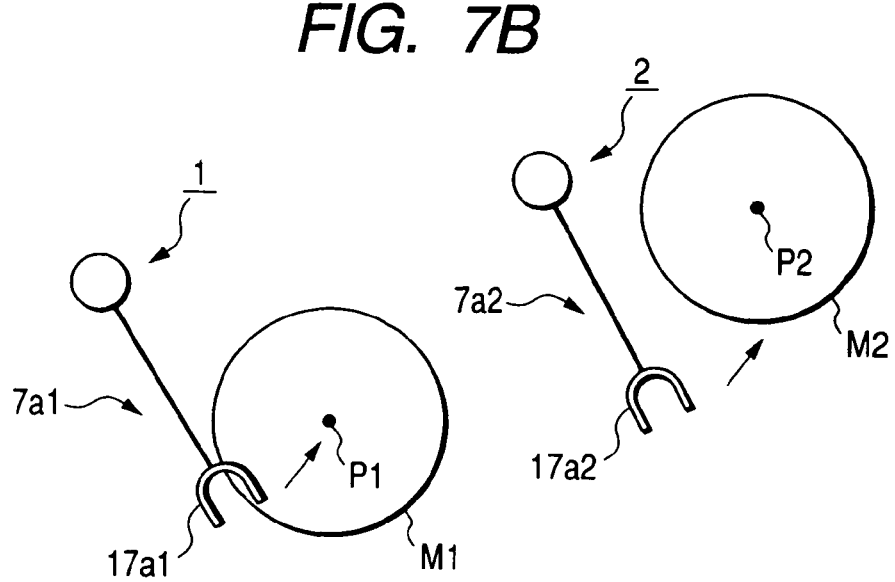
FIG. 7B is an enlarged view schematically illustrating another positional relationship among the first and second occupation regions and the first and second robots according to the embodiment.

In contrast, as illustrated in FIG. 7B, it is assumed that:

the hand 17a1 of the first robot 1 is being moved toward the target position P1 of the first robot 1 in the first occupation region M1; and the hand 17a2 of the second robot 2 located away from the first occupation region M1 to be close to the second occupation region M2 is being moved toward the target position P2 of the second robot 2 in the second occupation region M2.

In this assumption, because the hand 17a2 of the second robot 2 is located out of the first occupation region M1, the CPU 18 of the first robot 1 makes a negative determination in step S7, proceeding to step S8.

In step S8, the CPU 18 continues the motion of the hand 17 toward the target position while sending the actual position to the CPU 18 of the other of the first and second robots 1 and 2 and executing the determination in step S7. During the continuous motion of the hand 17, the CPU 18 determines whether the hand 17 reaches the target position in step S9. In other words, in step S8, the CPU 18 continues the motion of the hand 17 toward the target position unless the determination in step S7 is YES, or the determination in step S9 is YES.

Specifically, if an affirmative determination is made in step S7 during the continuous motion of the hand 17 in step S8, the CPU 18 proceeds to step S10.

When the hand 17 reaches the target position so that an affirmative determination is made in step S9, the CPU 18 returns to step S1. Then, the CPU 18 sends the first or second operation command to each motor 24 via a corresponding one of the drive circuits 19, thereby starting the movement of the corresponding robot body toward the next target position corresponding to the sent first or second operation command.

On the other hand, if it is determined that the other of the robot bodies 7a1 and 7a2 is at least partly located in the corresponding one of the occupation regions M1 and M2 in step S7, the CPU 18 goes to step S10.

In step S10, in response to the affirmative determination in step S7, the CPU 18 starts braking the motion of each of the linkages 11 to 16 of the corresponding one of the robot bodies 7a1 and 7a2.

Specifically, in step S10, the CPU 18 controls a corresponding one of the drive circuits 19 to switch the direction of current to be supplied to each of the motors 24 to allow each of the motors 24 to generate reverse torque to be applied in the direction opposite to the motor rotating direction, thereby braking the motion of each of the linkages 11 to 16 of the one of the robot bodies 7a1 and 7a2.

The braking brings the hand 17 of the corresponding one of the robot bodies 7a1 and 7a2 to a halt at a position slightly inside the corresponding one of the occupation regions M1 and M2 (see the hand 17a1 as an example in FIG. 8B).

In the embodiment, if a second braking torque corresponding to the reverse torque is set to be larger than the first braking torque used in step S5, the braking can bring the hand 17 of the corresponding one of the robot bodies 7a1 and 7a2 to a halt at a position just before the corresponding one of the occupation regions M1 and M2.

Specifically, the braking can prevent the robot bodies 7a1 and 7a2 from interfering with each other inside the corresponding one of the occupation regions M1 and M2.

After the completion of braking in step S10, the CPU 18 stands by for detecting exit of the other of the robot bodies 7a1 and 7a2 from the corresponding one of the occupation regions M1 and M2 based on the relationship between the actual position of each linkage and the hand of the other of the robot bodies 7a1 and 7a2 and the corresponding one of the occupation regions M1 and M2 in step S11.

If it is determined that the other of the robot bodies 7a1 and 7a2 is exited from the corresponding one of the occupation regions M1 and M2 (the determination in step S11 is YES), the CPU 18 proceeds to step S12.

In step S12, the CPU 18 continues the motion of the hand 17 toward the target position from where the motion of the corresponding one of the robot bodies 7a1 and 7a2 has been stopped, returning to step S5 and executing the operations in step 55 and later.

Task in Case of Occurrence of Overlap Between Occupation Regions

For example, as illustrated in FIG. 8A, when the target positions P1 and P2 of the first and second robots 1 and 2 are located inside the shared workspace B (the pallet 5), the first and second occupation regions M1 and M2 may be partially overlapped with each other to form an overlap portion as an interference region V.

In this case, after the affirmative determination in step S4, in step S13, assuming that the CPU 18 controls the drive circuits 19 and the motors 24 to start braking the motion of each of the linkages 11 to 16 of the corresponding one of the robot bodies 7a1 and 7a2 by a predetermined third braking torque, the CPU 18 computes, based on the weight of each linkage and the hand and an actual angular velocity of each linkage, a braking distance by which each linkage and the hand has passed since the start of braking.

Moreover, in step S13, the CPU 18 estimates a stop position (coordinates) of each of the linkages 11 to 16 and the hand 17 of the corresponding one of the robot bodies 7a1 and 7a2 in the corresponding reference coordinate system based on the actual position and the braking distance of each of the linkages 11 to 16 and the band 17.

In step S13, the CPU 18 determines whether the estimated stop position of each of the linkages 11 to 16 and the hand 17 of the corresponding one of the robot bodies 7a1 and 7a2 is contained in the interference region V based on a relationship between each estimated stop position and the interference region V in the corresponding reference coordinate system.

If it is determined that no estimated stop positions of the linkages 11 to 16 and the hand 17 are contained in the interference region V (the determination in step S13 is NO), the CPU 18 proceeds to step S14.

In step S14, the CPU 18 continues the motion of the hand 17 toward the target position while sending the actual position to the CPU 18 of the other of the first and second robots 1 and 2 and executing the determination in step S13 until the determination in step S13 is YES.

Continuous motion of the hand 17 of the corresponding one of the robot bodies 7a1 and 7a2 allows the hand 17 to be slightly entered into the interference region V. At that time, the determination in step S13 is affirmative, the CPU 18 shifts to step S15.

In step S15, the CPU 18 determines whether the other of the robot bodies 7a1 and 7a2 is at least partly located in the interference region V based on a relationship between the actual position of each linkage and the hand of the other of the robot bodies 7a1 and 7a2 and the interference region V in the corresponding reference coordinate system.

If the other of the robot bodies 7a1 and 7a2 is not located inside the interference region V (the determination in step S15 is NO), the CPU 18 proceeds to step S16.

In step S16, the CPU 18 continues the motion of the hand 17 toward the target position while sending the actual position to the CPU 18 of the other of the first and second robots 1 and 2 and executing the determination in step S15. During the continuous motion of the hand 17, the CPU 18 determines whether the hand 17 reaches the target position in step S16. In other words, the CPU 18 continues the motion of the hand 17 toward the target position unless the determination in step S13 is YES, or the determination in step S16 is YES.

Specifically, if an affirmative determination is made in step S15 during the continuous motion of the hand 17, the CPU 18 proceeds to step S17.

When the hand 17 reaches the target position so that an affirmative determination is made in step S16, the CPU 18 returns to step S1. Then, the CPU 18 sends the first or second operation command to each motor 24 via a corresponding one of the drive circuits 19, thereby starting the movement of the corresponding robot body toward the next target position corresponding to the sent first or second operation command.

For example, as illustrated in FIG. 8B, when the braking of the hand 17a1 located at the actual position PA1a is assumed to be started, the hand 17a1 is assumed to be shifted by a bang distance S1 so that it reaches the stop position PA2a out of the interference region V.

In this assumption, when the stop position of the hand 17a2 is assumed to be located inside the interference region V, the CPU 18 of the second robot 2 makes a negative determination during the continuous motion of the hand 17a2 in step S15. Accordingly, the hand 17a2 reaches the target position P2 before the hand 17a1 reaches the target position P1 (see step S16).

Thereafter, as illustrated in FIGS. 8C and 8D, the CPU 18 of the second robot 2 sends the second operation command to each motor 24 of the robot body 7a2 via a corresponding one of the drive circuits 19. This permits the robot body 7a2 to start of movement toward the next target position of the workbench 6 corresponding to the sent second operation command (see step S1); this next target position and the next occupation region are represented in FIGS. 8C and 8D as P2A and M2A, respectively.

Figure 8E:
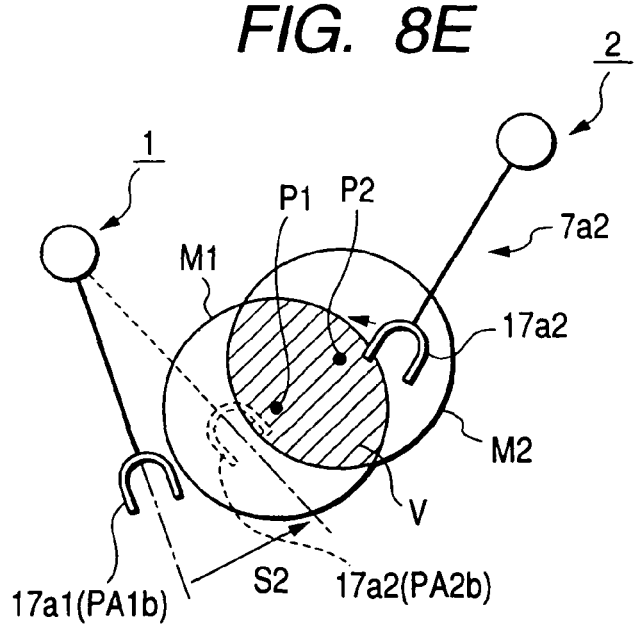
FIG. 8E is an enlarged view schematically illustrating a further positional relationship among the first and second occupation regions, the interference region therebetween, and the first and second robots according to the embodiment.
Figure 9:
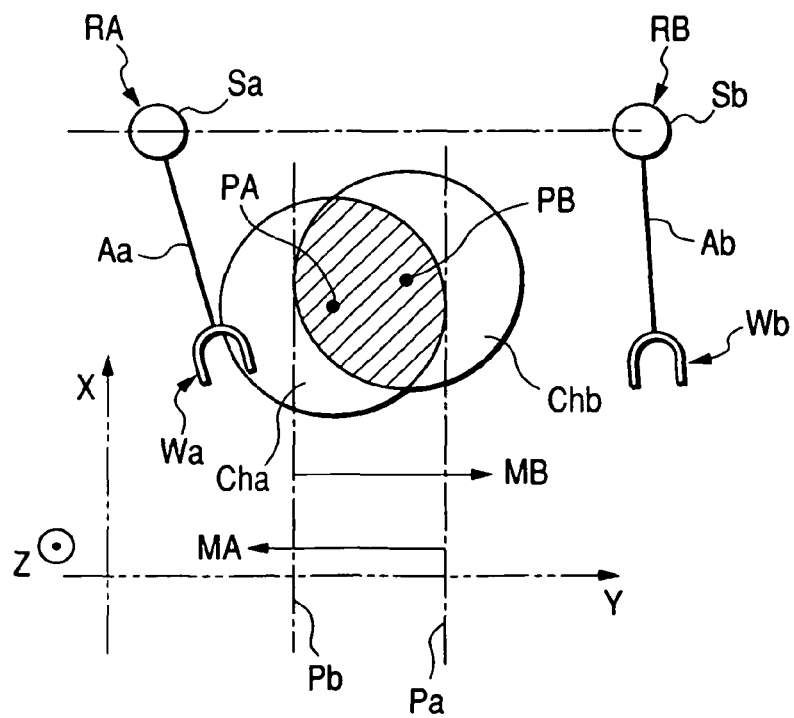
FIG. 9 is a top plan view schematically illustrating first and second robots mounted on a common plane through bases.

On the other hand, referring to FIG. 8E, for example, when the braking of the hand 17a1 located at an actual position PA1b is assumed to be started, the hand 17a1 is assumed to be shifted by a braking distance S2 so that it reaches a stop position PA2b slightly inside the interference region V.

In this assumption, the CPU 18 of the first robot 1 makes an affirmative determination in step S13. Next, because the actual position of the hand 17a2 is partially located inside the interference region V, the CPU 18 of the first robot 1 makes an affirmative determination in step S15, proceeding to step S17.

In step S17, in response to the affirmative determination in step S15, the CPU 18 of the first robot 1 starts braking the motion of each of the linkages 11 to 16 of the robot body 7a1.

Specifically, in step 817, the CPU 18 controls a corresponding one of the drive circuits 19 to switch the direction of current to be supplied to each of the motors 24 to allow each of the motors 24 to generate reverse torque to be applied in the direction opposite to the motor rotating direction, thereby braking the motion of each of the linkages 11 to 16 of the robot body 7a1.

The braking brings the hand 17a1 of the robot body 7a1 to a halt at a position slightly inside the interference region V (see the hand 17a1 as an example in FIG. 8E).

In the embodiment, if a fourth braking torque corresponding to the reverse torque is set to be larger than the third braking torque used in step S13, the braking can bring the hand 17a1 of the robot body 7a1 to a halt at a position just before the interference region V.

When the braking of the hand 17a2 located at an actual position is assumed to be started, the hand 17a2 is assumed to be shifted by a braking distance so that it reaches a stop position slightly inside the interference region V, the operations in steps S13, S15, and S17 with respect to the robot body 17a2 allow the hand 17a2 to be stopped at a position just before or slightly inside the interference region V.

Specifically, the braking can prevent the robot bodies 7a1 and 7a2 from interfering with each other inside the interference region V.

After the completion of braking in step S17, the CPU 18 stands by for detecting exit of the other of the robot bodies 7a1 and 7a2 from the interference region V based on the relationship between the actual position of each linkage and the hand of the other of the robot bodies 7a1 and 7a2 and the interference region V in step S18.

If it is determined that the other of the robot bodies 7a1 and 7a2 is exited from the interference region V (the determination in step S18 is YES), the CPU 18 proceeds to step S19.

In step S19, the CPU 18 continues the motion of the hand 17 toward the target position from where the motion of the corresponding one of the robot bodies 7a1 and 7a2 has been stopped, returning to step S4 and executing the operations as in the case of no occurrence of overlaps between the first and second occurrence regions M1 and M2 in steps S5 to S12.

As a result, the corresponding one of the robot bodies 7a1 and 7a2 can move the corresponding target position without interfering with the other of the robot bodies 7a1 and 7a2, thereby executing a predetermined task at the target position.

For example, as illustrated in FIGS. 8C and 8D, after the hand 17a2 of the robot body 7a2 is exited out of the first occupation region M1, the hand 17a1 of the robot body 7a1 restarts moving toward the target position P1 of the pallet 5 (see steps S5 to S12).

As described above, let us consider that the first and second occupation regions at the respective target positions for the first and second robots 1 and 2 may be partially overlapped with each other to form the interference region.

In this situation, even if one of the robots 1 and 2 is located inside the interference region to execute a predetermined process, it is possible to move the other of the robots 1 and 2 up to a position just before or slightly inside the interference region, thereby keeping it standby state at the position.

For this reason, when the other of the robots 1 and 2 is exited from the interference region, it is possible to make the one of the robots 1 and 2 immediately reach the corresponding one of the target positions, reducing the length of time required to execute one working cycle of the one of the robots 1 and 2.

Note that the present invention is not limited to the embodiment described above and illustrated in FIGS. 1 to 8E.

The diameter of the cylindrical occupation region M (M1, M2) can be set to be slightly longer than the maximum width (lateral length) of the forked tip end of the second lower arm 14. This allows interference between the robot bodies 7a1 and 7a2 to be reliably avoided even when the hand of one of the robot bodies 7a1 and 7a2 is stopped slightly inside the interference region V.

The cylindrical occupation region M (M1, M2) can have a predetermined axial length. In this case, even when the occupation regions M1 and M2 seem to be overlapped with each other as viewing from the top side of each robot, when they have no overlapped portions as viewing from one side of each robot orthogonal to the axial direction, it is possible to determine that the occupation regions M1 and M2 have no overlapped portions.

In the embodiment, the occupation region M (M1, M2) is defied as a substantially cylindrical region whose center axis is arranged to be coaxial to the Zf axis of the downward-directed flange 16 of the robot body such that a diameter of the occupation region is set to be equal to or slightly longer than the maximum width (lateral length) of the forked tip end of the second lower arm 14 of the robot body. However, the present invention is not limited to the configuration.

Specifically, an occupation region of the robot body of each of the first and second robots can be defined to have one of various configurations to prevent interference between the robot bodies of the first and second robots with each other even though their movable portions are entered into the shared workspace of the first and second robots unless one of the movable portions of the robot bodies enters into the occupation region of the other of the robot bodies.

The working system according to the embodiment includes the first and second robots 1 and 2, but, in the present invention, the working system can include three or more robots, and the controller of each of the three or more robots can execute the robot motion task.

The present invention can be applied to various types of robots without limiting such a vertical articulated robot.

In the embodiment, the first and second robots individually have first and second controllers, but they can have a shared controller including the same functions as each of the first and second controllers.

While there has been described what is at present considered to be the embodiment and its modifications of the present invention, it will be understood that various modifications which are not described yet may be made therein, and it is intended to cover in the appended claims all such modifications as fall within the true spirit and scope of the invention.

What is claimed is:

1. A method of avoiding interference between first and second movable parts of first and second robots during movement of the first and second movable parts toward first and second target positions, respectively, the method comprising:

defining a first occupation region for the first movable part of the first robot at the first target position, the first occupation region depending on a pose of the first movable part located at the first target position and identifying an interference range of the pose of the first movable part;

defining a second occupation region for the second movable part of the second robot at the second target position, the second occupation region depending on a pose of the second movable part located at the second target position and identifying an interference range of the pose of the second movable part;

determining whether there is an interference region in which the first occupation region and the second occupation region are at least partially overlapped with each other;

determining whether at least one of the first and second movable parts is at least partially located in the interference region based on actual positions of the respective first and second movable parts; and beginning stopping, at a predetermined timing, the movement of one of the first and second movable parts if it is determined that there is the interference region and that the other of the first and second movable parts is at least partially located in the interference region, the predetermined timing being determined based on a positional relationship between the actual position of the one of the first and second movable parts and the interference region.

2. A method according to claim 1, wherein the beginning includes:

when braking of the movement of the one of the first and second movable parts is assumed to be started at the actual position, estimating a stop position of the one of the first and second movable parts;

determining whether the estimated stop position of the one of the first and second movable parts is contained in the interference region; and beginning braking the movement of the one of the first and second movable parts if it is determined that the estimated stop position of the one of the first and second movable parts is contained in the interference region and that the other of the first and second movable parts is at least partially located in the interference region.

3. The method according to claim 1, further comprising:

when it is determined that the other of the first and second movable parts is exited from the interference region based on the actual position of the other of the first and second movable parts after the stopping, continuing the movement of the one of the first and second movable parts from where the movement of the one of the first and second movable parts has been stopped.

4. A robot communicable with another robot, the robot comprising:

a first movable part;

an operating unit configured to operate the first movable part so as to move the first movable part toward a first target position;

a defining unit configured to define a first occupation region for the first movable part at the first target position, the first occupation region depending on a pose of the first movable part located at the first target position and identifying an interference range of the pose of the first movable part;

an accessing unit configured to access another robot with a second movable part during movement to obtain information indicative of a second occupation region for the second movable part at a second target position and an actual position of the second movable part, the second occupation region depending on a pose of the second movable part located at the second target position and identifying an interference range of the pose of the second movable part;

a first determining unit configured to determine whether there is an interference region in which the first occupation region and the second occupation region are at least partially overlapped with each other;

a second determining unit configured to determine whether the second movable part is at least partially located in the interference region based on the obtained actual position thereof; and a stopping unit configured to begin stopping, at a predetermined timing, movement of the first movable part if it is determined that there is the interference region and that the second movable part is at least partially located in the interference region, the predetermined timing being determined based on a positional relationship between an actual position of the first movable part and the interference region.

5. The robot according to claim 4, wherein the stopping unit includes:

an estimating unit configured to, when bring of the movement of the first movable part is assumed to be started at the actual position, estimate a stop position of the first movable part;

a third determining unit configured to determine whether the estimated stop position of the first movable part is contained in the interference region; and a braking unit configured to begin braking movement of the first movable part if it is determined that the estimated stop position of the first movable part is contained in the interference region and that the second movable part is at least partially located in the interference region.

6. The robot according to claim 4, further comprising:

when it is determined that the second movable part is exited from the interference region based on the obtained actual position after the stopping, a continuing unit configured to continue the motion of the first movable part from where the motion of the first movable part has been stopped.

7. A robot controller for a robot communicable with another robot and having a first movable part, in which the robot controller is operatively connected to a stopping unit, the robot controller being programmed to:

operate the first movable part so as to move the first movable part toward a first target position;

define a first occupation region for the first movable part at the first target position, the first occupation region at the first target position depending on a pose of the first movable part located at the first target position and identifying an interference range of the pose of the first movable past;

access another robot with a second movable part during movement to obtain information indicative of a second occupation region for the second movable part at a second target position and an actual position of the second movable part, the second occupation region at the second target position depending on a pose of the second movable part located at the second target position and identifying an interference range of the pose of the second movable part;

determine whether there is an interference region in which the first occupation region and the second occupation region are at least partially overlapped with each other;

determine whether the second movable part is at least partially located in the interference region based on the obtained actual position thereof; and control the stopping unit to begin stopping, at a predetermined timing, movement of the first movable part if it is determined that there is the interference region and that the second movable part is at least partially located in the interference region, the predetermined timing being determined based on a positional relationship between an actual position of the first movable part and the interference region.

8. The robot controller according to claim 7, wherein, as the control of the stopping unit, the robot controller is programmed to:

when braking of the movement of the first movable part is assumed to be started at the actual position, estimate a stop position of the first movable part;

determine whether the estimated stop position of the first movable part is contained in the interference region; and cause the stopping unit to begin braking movement of the first movable part if it is determined that the estimated stop position of the first movable part is contained in the interference region and that the second movable part is at least partially located in the interference region.

9. The robot controller according to claim 7, wherein the robot controller is further programmed to, when it is determined that the second movable part is exited from the interference region based on the obtained actual position after the stopping, continue the motion of the first movable part from where the motion of the first movable part has been stopped.

* * * * *